Oct. 18, 1966
J. BELART
3,279,566
STEPLESS BRAKE ADJUSTER
Filed Oct. 28, 1964
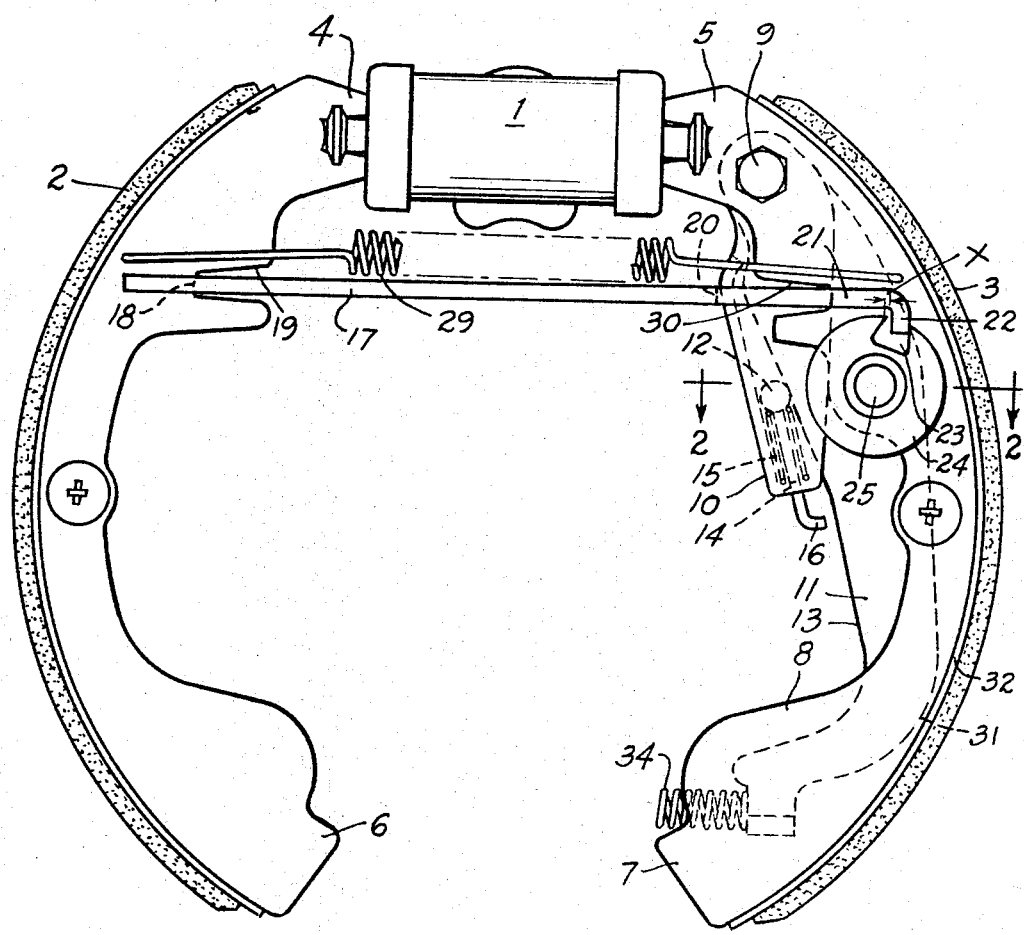
FIG_1
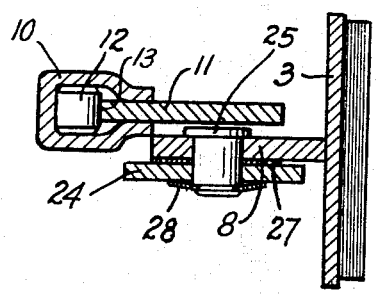
FIG_2
INVENTOR.
JUAN BELART.
BY
Sheldon F. Rayes
ATTORNEY.

United States Patent Office 3,279,566
Patented Oct. 18, 1966

3,279,566
STEPLESS BRAKE ADJUSTER
Juan Belart, Walldorf, Hesse, Germany, assignor to Alfred Teves K.G., a company of Germany
Filed Oct. 28, 1964, Ser. No. 407,195
Claims priority, application Germany, Oct. 29, 1963, T 24,976
7 Claims. (Cl. 188—79.5)

The invention relates to a hydraulically actuated internal shoe drum brake for automotive vehicles comprising a hand lever pivotally mounted on a brake shoe web portion located near the wheel cylinder and acting by means of a strut onto a portion of the web of a second brake shoe also located near said wheel cylinder.

The object of the invention is to provide an automatic adjuster of the brake shoes adapted to take up the wear upon each actuation of the hand lever while providing a predetermined clearance between the brake shoes and the drum.

The automatic adjuster according to the invention will be described in application to a shoe acting as a leading shoe in forward braking.

Another object of the invention is to provide an adjustment lever pivoted together with the hand lever to one brake shoe, the adjustment lever taking abutment on the strut connected to the second brake shoe, and cooperating with the said one brake shoe by means of a roller biased by a compression spring which takes abutment on free end of the adjustment lever and biases said roller along an edge of the hand lever to position the hand lever with respect to the web of the said one shoe. The end of the strut taking support on the adjustment lever is provided with a crank projecting into a radial recess formed on a disc mounted on the brake shoe by means of a friction connection. The brake shoe ends adjacent to the wheel cylinder are interconnected by a return spring which provides a friction connection between the strut and the respective recesses formed in the brake shoes and into which project the respective ends of the strut.

Other objects and features of the invention will appear from the specification given hereunder with reference to the accompanying drawings in which:

FIGURE 1 is a front view of a brake embodying the invention and

FIGURE 2 is a cross sectional view according to the lines 2—2 of the FIGURE 1.

The brake is provided with a wheel cylinder 1 secured to a backing plate not shown, and which upon the pressurization thereof spreads the brake shoes 2 and 3 one from another. The brake shoes formed with ends adjacent to the wheel cylinder are indicated in 4 and 5. The opposite ends 6 and 7 of the brake shoes can be pivoted on anchor pins or take support on an anchorage secured to the backing plate.

The brake shoe 3 has a web 8 on which the adjustment lever 10 is pivotally mounted by means of a pin 9 as shown in FIGURE 1. The lever 10 as shown on the drawings, has a box structure into which projects the hand lever 11. The hand lever 11 is also pivoted on the pin 9.

In the box type lever 10 is mounted an antifriction member formed by roller 12 located in such a manner that it can roll along the edge 13 of the hand lever 11. The free end of the adjustment lever 10 forms an abutment 14 for a compression spring 15 which biases the roller 12 along the edge 13. The crank 16 is integrally made with the roller 12 and is used for mounting purposes.

The strut 17 forms part of the hand lever actuation device and is formed with an abutment 18 taking support on a recess 19 formed in the brake shoe 2 and as well as with an abutment 20 which is urged against the adjustment lever 10. An extension 21 on the strut 17 forms a crank 22 projecting with lost motion X into a recess 23 formed on the periphery of a disc 24.

The disc 24 is secured to the web 8 of the brake shoe 3. A friction washer 27 is mounted between the web 8 and the said disc 24. A disc spring 28 determines the friction force exerted between the web 8, the disc and the friction washer 27.

The brake shoes 2 and 3 are interconnected by a brake shoe return spring 29, which biases the strut 17 into the recesses 19 and 30 respectively formed in the brake shoes 2 and 3 to suppress any lost motion in the connection realized by the strut 17.

In the rest position the hand lever 11 takes abutment in 31 against the brake shoe rim 32 secured to the brake shoe web 8. A compression spring 34 biases the hand lever 13 into the abutment position.

For actuation of the brake, the hand lever 11 is rotated into clockwise direction. It exerts a pressure through the strut 17 on the brake shoe 2 and at the same time exerts a reaction through connection pin 9 onto the brake shoe 3, so that both brake shoes are brought into engagement with the friction surface of the brake drum (not shown).

The crank 22 will thus be moved to the left in the recess 23 and take up the lost motion X.

The movement of the strut 17 towards the left causes the compression spring 15 to shift the roller 12 along the edge 13 of the hand lever 11 thus retaining the contact of the adjustment lever with the abutment 20 on the strut 17.

As the wear of the brake shoes increases the brake shoes become progressively spread one from another. The crank 22 carries therewith the left edge of the recess 23 on the disc 24, as the actuation force is sufficiently large to overcome the friction between the members 24, 8 and 27. Since the adjustment lever 10 always remains in contact with the abutment 20 on the strut 17 upon release of the brake, both brake shoes move to release position under the action of the return spring 29, which movement is transmitted to the strut 17. The said strut is thus returned in the position shown in the FIGURE 1, and the lost motion X is restored, as shown. The disc 24 undergoes a rotation corresponding to the amplitude of the wear.

The brake is adapted to be adjusted also upon hydraulic actuation thereof. The amount of the adjustment depends as to whether the strut 17 is released from the abutment 20 in spite of the friction exerted on said strut by the spring 29 so as to cause a rotation of disc 24 counterclockwise. In other words, the clockwise rotation of the hand lever 11 can cause crank 22 to rotate the disc 24, and the hydraulic expansion of the shoes 2 and 3 can similarly rotate the disc. In the latter type of operation the roller connection between the levers 10 and 11 pull the crank, so as to rotate the recess 23 first counterclockwise then clockwise on release to reposition the brake shoes, if excessive travel is experienced.

What is claimed is:

1. An internal shoe brake including a pair of brake shoes, a hand lever pivoted on one brake shoe by means of a pin and connected to the second brake shoe by means of a strut, an adjustment lever pivoted on the said one brake shoe by means of the same pin, said levers angularly spaced one from another on the said pin, being interconnected by means of roller, a spring biasing the said roller into the space formed between the said levers along a path corresponding to the increase of the angular distance between said levers, and friction means operatively connected to said strut for retaining the angular distance between the levers upon shifting of the roller by the said spring.

2. A brake according to claim 1 in which the adjustment lever has a box structure, and the hand lever projects into said box structure.

3. A brake according to claim 1 including a return spring which interconnects the brake shoe ends cooperating one with another by means of the strut, said spring keeping in release position of the hand levers the ends of said strut in engagement with a pair of abutments provided by two recesses respectively formed in the brake shoe webs.

4. An internal shoe brake according to claim 2 including a crank on the strut for operating said friction means comprising a disc frictionally mounted on the said one shoe, said disc having a recess with said crank being mounted within said recess and normally in contact with one edge of the recess and having a lost motion connection with another edge of the recess corresponding to the brake shoe's clearance.

5. An internal shoe brake including a drum, a fixed support, a pair of brake shoes connected to a fluid operated cylinder at one end thereof and adapted to anchor in accordance with the direction of rotation of the drum on an anchorage carried by the fixed support, a hand lever pivotally mounted at one end thereof on the shoe acting as a leading shoe in forward braking, a strut interconnecting the said hand lever with the other shoe, an adjustment lever pivotally mounted on the said one shoe, said levers being angularly spaced one from another, an antifriction means located between said levers, a spring urging said antifriction means in a direction to increase the angular spacing of said levers, and friction means mounted on the said one shoe and interconnected with the said strut by a lost motion corresponding to the brake shoe clearance.

6. An internal shoe brake according to claim 5 and further including a spring operatively connected to the end of the hand lever opposite said one end pivoted on said brake shoe to bias said lever to a released position.

7. An internal shoe brake including a pair of shoes, a hand lever pivotally mounted to one shoe and connected to the other shoe by means of a strut, an adjustment lever pivotally mounted with said hand lever to said one shoe and operatively connected to said strut, friction means operatively connected to said strut including a friction washer, a disc and a means to bias said disc against said friction washer and said friction washer against said one shoe, and means operatively connecting said hand lever and said adjustment lever and arranged to increase the angular distance between said levers in response to the wear of the shoes of said shoe brake so as to maintain the position of said hand lever with respect to said one shoe.

References Cited by the Examiner
UNITED STATES PATENTS

| | | | |
|---|---|---|---|
| 2,292,017 | 8/1942 | Smith | 188—106 |
| 2,822,893 | 2/1958 | Flueler | 188—79.5 |
| 3,016,990 | 1/1962 | Towns | 188—79.5 |

DUANE A. REGER, *Primary Examiner.*